United States Patent [19]
Ogino et al.

[11] Patent Number: 4,768,842
[45] Date of Patent: Sep. 6, 1988

[54] HYDRAULIC BOOSTER WITH ANTISKID DEVICE

[75] Inventors: Kinji Ogino; Namio Watanabe, both of Saitama, Japan

[73] Assignees: Akebono Brake Industry Co., Ltd., Tokyo; Akebono Research and Development Centre Ltd., Saitama, both of Japan

[21] Appl. No.: 917,180

[22] Filed: Oct. 9, 1986

[30] Foreign Application Priority Data

Oct. 14, 1985 [JP] Japan .............................. 60-228289
Oct. 28, 1985 [JP] Japan .............................. 60-240764

[51] Int. Cl.$^4$ .......................... B60T 8/44; B60T 13/68; B60T 13/70
[52] U.S. Cl. .................................. 303/114; 303/119; 303/113
[58] Field of Search ...... 188/181 A; 303/92, 113–119, 303/105

[56] References Cited

U.S. PATENT DOCUMENTS 3,606,488  9/1971  Beuchle et al. ................. 303/114
4,175,794  11/1979  Pauwels ......................... 303/105
4,417,768  11/1983  Satoh et al. ..................... 303/113
4,589,706  5/1986  Leiber .............................. 303/114
4,629,258  12/1986  Resch et al. ................. 303/114 X

FOREIGN PATENT DOCUMENTS 2437211  2/1976  Fed. Rep. of Germany ... 188/181 A
3511972  10/1986  Fed. Rep. of Germany ...... 303/115

Primary Examiner—Andres Kashnikow
Assistant Examiner—Timothy Newholm
Attorney, Agent, or Firm—Toren, McGeady & Associates

[57] ABSTRACT

A hydraulic booster with an antiskid device, comprising a hydraulic booster type pedal responsive device arranged to introduce from an accumulated pressure source, hydraulic pressure the level of which is determined depending on a pedalling force applied to a brake pedal, a master cylinder type control hydraulic pressure generating device which generates control hydraulic pressure according to the hydraulic action of the introduced hydraulic pressure, and a slave cylinder device arranged to generate braking hydraulic pressure by a power piston which moves by receiving the control hydraulic pressure at one end. The slave cylinder device includes an antiskid fluid chamber arranged to exert hydraulic pressure on the power piston in the direction of returning the power piston, and an antiskid control solenoid operated valve device which is disposed in a transmission line for transmitting the introduced hydraulic pressure of the pedal responsive device and is arranged to supply and discharge a pressure fluid to and from the antiskid fluid chamber on the basis of an antiskid signal input.

3 Claims, 2 Drawing Sheets ic booster as a first example of this invention.
HYDRAULIC BOOSTER WITH ANTISKID DEVICE

BACKGROUND OF THE INVENTION

FIELD OF THE INVENTION

This invention relates to a hydraulic booster incorporating therein an antiskid device in one unified body.

Heretofore, the brake system for braking a vehicle has been provided with various devices including among others a hydraulic booster which is arranged to boost a hydraulic power and an antiskid control device for preventing the vehicle from falling into a wheel locked state during brake application. According to the generally employed practice, these devices are discretely arranged. However, since they are designed for inclusion in one and the same vehicle brake system, suitable arrangement to combine them into one unit would facilitate assembly work on the brake system of the vehicle and also permit improvement in the structural arrangement and functions. To attain these advantages, a device has been arranged to combine an hydraulic booster and an antiskid control device into one body, for example, as disclosed in U.S. Pat. No. 4,482,192.

However, such a unified type device must be arranged to assure an adequate operation of the antiskid control device which is only rarely required to operate and also to have the normal braking system remain unaffected even in the event of a failure arising in the antiskid control system.

SUMMARY OF THE INVENTION

This invention is directed to meet the abovestated requirement. It is therefore an object of this invention to provide a hydraulic booster which is capable of improving the operation reliability of an antiskid control device included therein and is arranged to ensure that a normal braking system remains unaffected by a failure in the antiskid control system.

DETAILED DESCRIPTION OF THE INVENTION

The present invention will be described in detail with reference to the preferred embodiments shown in the accompanying drawings.

EXAMPLE I

Figure 1:
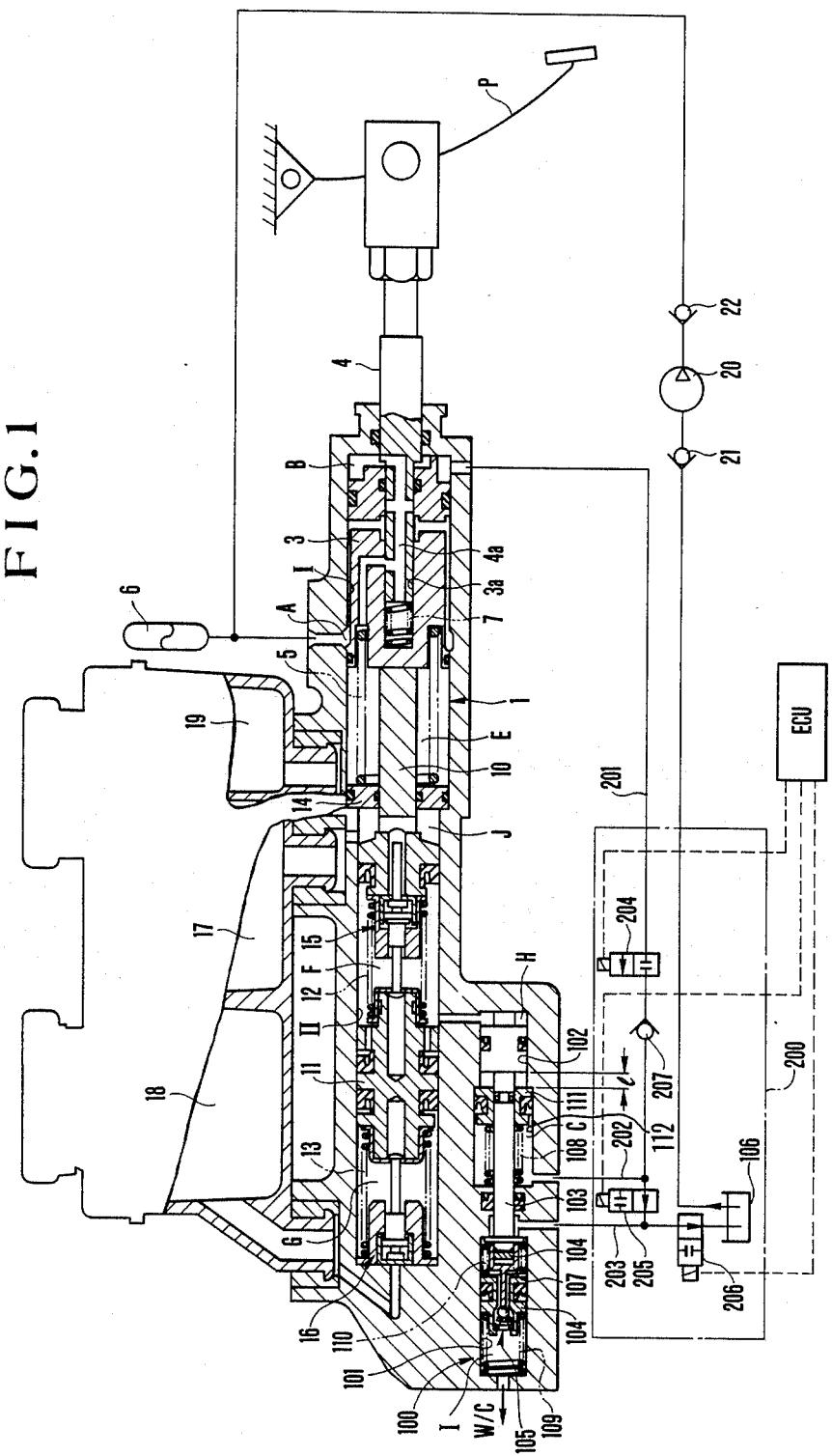
FIG. 1 shows in outline the arrangement of a hydraulic booster as a first example of this invention.

Referring to FIG. 1, a first example of this invention is arranged as follows: The embodiment comprises in combination a master cylinder device 1 including, within first and second concentric stepped cylinders I and II, a hydraulic booster type pedal responsive device and a master cylinder type control hydraulic pressure generating arrangement; a slave cylinder device 100 including a control fluid chamber H which is connected to the control fluid chamber F of the master cylinder device; and an antiskid control solenoid operated valve device 200 which is arranged to supply and discharge hydraulic pressure to and from the antiskid fluid chamber C of the slave cylinder device. In the drawing, the slave cylinder device which is connected in hydraulic arrangement to a control fluid chamber G of another channel of the tandem master cylinder type control hydraulic pressure generating device is omitted from the illustration. In the case of this embodiment, the brake hydraulic pressure system consists of two independent channels. Two sets of independent slave cylinder devices and antiskid control solenoid operated valve devices are respectively arranged in association with the two control fluid chambers F and G of the tandem type master cylinder device. Each of these components is arranged as described below:

Master Cylinder Device 1: The cylinder device 1 includes the pedal responsive device. The pedal responsive device has a control piston 3 which is provided with a suitably formed fluid passage and slidably engages the first cylinder I. The piston 3 is pushed toward the rear end opening (on the right-hand side as viewed on FIG. 1) by a return spring 5. Meanwhile, a fluid passage change-over piston 4 slidably engages a cylinder 3a which is arranged inside the stem of the control piston 3. The rear end part of the piston 4 is engaged with a brake pedal P.

The arrangement of the pedal responsive device consisting of the control piston 3 and the change-over piston 4 is substantially identical with that of the conventional hydraulic booster. Under a non-brake applying condition, the pedal responsive device is in a state as shown in FIG. 1. An introduced fluid chamber B and a hydraulic pressure discharge fluid chamber E are communicating via a passage 4a. When the change-over piston 4 is pushed inward relative to the control piston 3 by a pedalling force, the communication between the fluid chambers B and E is blocked while, in place of this, the fluid chamber A on the pressure source side comes to communicate with the fluid chamber B. The fluid chamber A is connected to a pressure accumulator 6.

When hydraulic pressure is introduced into the fluid chamber B by the communication between the fluid chambers A and B, a hydraulic force counteracting the pedalling force of the brake pedal P comes to act on the fore end of the change-over piston 4. This in turn acts as a reaction to the pedalling force. Accordingly, hydraulic pressure which is proportional to the pedalling force exerted on the brake pedal P is transmitted to the fluid chamber B from the fluid chamber A. Then, the communication among the fluid chambers A, B and E is shut off under this condition. When hydraulic pressure is introduced into the fluid chamber B, the control piston 3 is moved forward (to the left as viewed on FIG. 1) by the action of the introduced hydraulic pressure against the force of the return spring 5. Further, the change-over piston 4 is provided with a return spring 7.

Next, the tandem master cylinder type control hydraulic pressure generating device which is provided within the second cylinder II is arranged as described below:

The arrangement includes first and second pistons 10 and 11 and a pair of return springs 12 and 13 which are arranged to bias these pistons to their initial positions. These pistons 10 and 11 and the return springs 12 and 13 are disposed within the cylinder II. The rear end (the right end as viewed on FIG. 1) of the first piston 10 is connected to the control piston 3 and is arranged to receive the moving force of the control piston 3 as an external input. The piston 10 is thus arranged to cause control hydraulic pressure to be generated within a pair of control fluid chambers F and G. The hydraulic pressure of the pair of control fluid chambers F and G is balanced by virtue of the balancing action of the second piston 11. The first piston 10 is provided with a guide ring 14. One-way seal devices 15 and 16 are arranged to permit fluid supply from reservoirs 17 and 18 to the control fluid chambers F and G.

The master cylinder device 1 which is arranged as described above introduces a given value of hydraulic pressure into the introduced fluid chamber B according to a pedalling force exerted on the brake pedal P. Control hydraulic pressure is then generated in the control fluid chambers F and G according to the value of this introduced hydraulic pressure. A boosting ratio is then determined according to a pressure receiving area which determines the magnitude of a hydraulic reaction force acting on the change-over piston 4.

Slave Cylinder Device 100: In the slave cylinder device of this embodiment, two concentrically opposed cylinders 101 and 102 are separated from each other in terms of hydraulic arrangement. A power piston 103 is disposed and extends inside of both these cylinders 101 and 102. The rear end (the right end as viewed on FIG. 1) of the power piston 103 faces a control fluid chamber H which communicates with the control fluid chamber F of the master cylinder device. The fore end (the left end as viewed on FIG. 1) of the power piston 103 engages a piston 104. The piston 104 has its fore end facing a brake fluid chamber I which communicates with the wheel cylinder W/C of a brake device. The piston 104 is arranged to discharge the pressure fluid of the brake fluid chamber I to a reservoir 106 under a normal condition (while in repose) with an incorporated opening and closing valve 105 thereof opened. When the piston 104 is moved by the power piston 103, the incorporated opening and closing valve 105 is closed to have thereby braking hydraulic pressure developed within the brake fluid chamber I. The opening and closing valve 105 is provided with a ball valve body which is disposed in the internal fluid passage of the piston 104 and is arranged to be separable from a valve seat by means of a lock rod 107. The slave cylinder device 100 includes return springs 108 and 109 which are provided for the power piston 103 and the piston 104; and a set spring 110 for the lock rod.

The stem part of the power piston 103 of the slave cylinder device 100 faces a large diameter cylinder 112. The cylinder 112 contains therein a return piston 111 which slidably engages the large diameter cylinder 112. The return piston 111 is biased into its initial position as shown in FIG. 1 by the above-stated return spring 108 which is engaging the piston 111. Under this condition, the return piston 111 confronts the power piston 103 across a given axial length of clearance l while the latter is in repose in its initial position. Such being the arrangement, this return piston 111 remains stationary until the power piston 103 is moved to the left by the hydraulic pressure of the control fluid chamber H to the extent of the above-stated given length l When the leftward move of the power piston 103 exceeds the given length l, the return piston 111 also moves to the left (on FIG. 1) following the power piston 103.

Within the large diameter cylinder 112 of the slave cylinder device, there is provided an antiskid fluid chamber C which is arranged to push the return piston 111 back to its initial position. The antiskid fluid chamber C is connected to the introduced fluid chamber B of the pedal responsive device via the antiskid solenoid operated valve device 200 which will be described later. In introducing hydraulic pressure, the return piston 111 is pushed back to the illustrated initial position. Accordingly, the power piston 103 which is in association with the piston 111 is pushed back to an extent $l_1$ from its initial position.

With the slave cylinder device 100 arranged as described above, during normal brake application, the power piston 103 moves depending on the hydraulic pressure value transmitted to the control fluid chamber C. This causes the piston 104 to move. Accordingly, the opening and closing valve 105 closes and braking hydraulic pressure develops at the braking fluid chamber I. In this instance, no hydraulic pressure is transmitted to the antiskid fluid chamber C.

During antiskid control, hydraulic pressure is transmitted to the antiskid fluid chamber C. The power piston 103 is then pushed back up to the extent $l_1$ toward the control fluid chamber H through the return piston 111. This causes the piston 104 to move backward. As a result, the braking hydraulic pressure decreases. Further, the hydraulic pressure of the antiskid fluid chamber C is removed again to increase braking hydraulic pressure. In other words, the increase, decrease and retention of the braking hydraulic pressure are effected depending on the hydraulic pressure condition of the antiskid fluid chamber C.

Antiskid Control Solenoid Operated Valve Device 200: In the case of this embodiment, the device 200 consists of a combination of a power supply valve 204 (hereinafter referred to as PSV for short) which is a normally closed type solenoid valve inserted in a connecting passage 201 between the introduced fluid chamber B of the pedal responsive device and the antiskid fluid chamber C; a hold valve 205 which is a normally open type solenoid valve inserted in a passage 202 provided for discharging the pressure fluid of the antiskid fluid chamber C to a reservoir 106; and a decay valve 206 which is a normally open type solenoid valve inserted in a passage 203 which is provided for discharging the pressure fluid of the braking fluid chamber I into the reservoir 106 through the opening and closing valve 105 of the slave cylinder device 100 mentioned in the foregoing. A check valve 207 is inserted in the passage 201. The reservoir 106 is only symbolically shown but corresponds to a reservoir 19 which is arranged in one unified body with the master cylinder device.

Each of the solenoid valves of the solenoid operated valve device 200 is arranged to receive antiskid control signals for decreasing, increasing or retaining the braking hydraulic pressure and to be opened and closed under antiskid control. The operation of these valves is, for example, accomplished in a manner as shown in the following table:

|  | PSV | Hold valve | Decay valve |
| --- | --- | --- | --- |
| Under a normal condition: | closed | opened | opened |
| In decreasing the pressure: | opened | closed | opened |
| In increasing the pressure: | opened | opened | closed |
| In retaining the pressure: | opened | closed | closed |

The antiskid signals for operating these solenoid valves are obtained from a known antiskid control circuit (hereinafter referred to as ECU) which is arranged to detect control data for decreasing, increasing or retaining the braking hydraulic pressure according to the velocity of the wheel and to produce the control signals as applicable. These solenoid valves may be operated by means of pulses.

The embodiment further includes a pump 20 which is arranged to supply the fluid of the reservoir 106 to the pressure accumulator 6; and check valves 21 and 22.

In the hydraulic booster with the antiskid control device arranged as described in the foregoing, the fluid chambers A, B and C of the antiskid control system are separately arranged from the fluid chambers F and H of the normal brake system in terms of hydraulic arrangement. The normal brake system is thus arranged to be not affected even in the event of a failure in the hydraulic pressure of the antiskid control system. This feature enhances the reliability of the brake system. In addition to this advantage, it is another advantage of the embodiment that the antiskid control system which does not often required to operate seldom has such a trouble as sticking due to rust as the antiskid control is arranged to be performed by applying hydraulic pressure to the power piston of the slave cylinder device, which is operative under the normal braking condition.

In accordance with the arrangement of this embodiment, during the antiskid control, the power piston 103 is returned by introducing hydraulic pressure into the antiskid fluid chamber C. Accordingly, there arises a return flow of the pressure fluid in the fluid chamber F which is communicating with the control fluid chamber H. Therefore, the piston 10 makes a returning movement to a given extent toward its initial position against the pedalling force exerted on the brake pedal P.

By virtue of this movement, even if hydraulic pressure fails at the fluid chamber G of one channel during antiskid control, at least a given degree of the pedalling stroke of the brake pedal P is secured. In addition to this advantage, it is another advantage that the returning degree of the brake pedal P is selectable within a necessary range by adjusting the connection clearance 1 provided between the power piston 103 and the return piston 111.

EXAMPLE II

Figure 2:
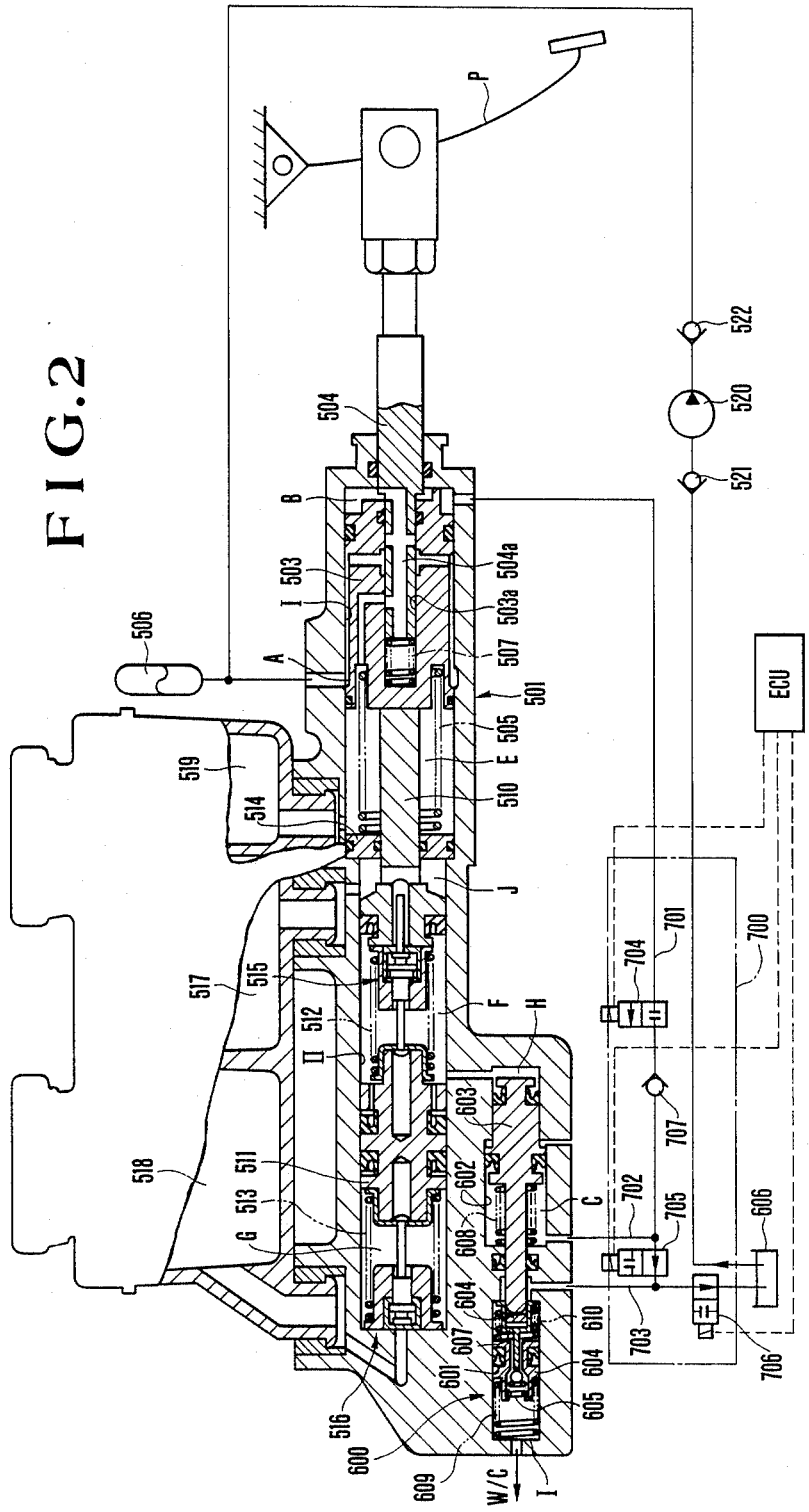
FIG. 2 shows in outline the arrangement of a hydraulic booster as a second example of this invention.

A second embodiment of this invention is arranged as described below with reference to FIG. 2:

The embodiment comprises in combination a master cylinder device 501 including, within first and second concentric stepped cylinders I and II, a hydraulic booster type pedal responsive device and a master cylinder type control hydraulic pressure generating device; a slave cylinder device 600 including a control fluid chamber H which is connected to the control fluid chamber F of the master cylinder device; and an antiskid control solenoid operated valve device 700 which is arranged to supply and discharge hydraulic pressure to and from the antiskid fluid chamber C of the slave cylinder device. In FIG. 2, the slave cylinder device which is connected in hydraulic arrangement to a control fluid chamber G of another channel of the tandem master cylinder type control hydraulic pressure generating device is omitted from the illustration. More specifically, in the case of this embodiment, the brake hydraulic pressure system consists of two independent channels. Two sets of independent slave cylinder devices and antiskid control solenoid operated valve devices are respectively arranged in association with the two control fluid chambers F and G of the tandem master cylinder type device. Each of these components is arranged as described below:

Master Cylinder Device 501: First, the pedal responsive device which is disposed within a cylinder 501 is arranged as follows: A control piston 503 which is provided with a suitably formed fluid passage slidably engages the first cylinder 501 and is biased to the rear end opening (the right end as viewed on FIG. 2) of the cylinder 501 by a return spring 505. A fluid passage change-over piston 504 slidably engages the inside of a cylinder 503a which is arranged inside the stem of the control piston 503. The rear end part of the piston 504 engages a brake pedal P.

The arrangement of the pedal responsive device consisting of the control piston 503 and the change-over piston 504 is substantially identical with that of the conventional hydraulic booster. Under a non-brake applying condition, the pedal responsive device is in a state as shown in FIG. 2. Under that condition, an introduced fluid chamber B and a hydraulic pressure discharge fluid chamber E are communicating with each other via a passage 504a. When the change-over piston 504 is pushed inward relative to the control piston 503 by a pedalling force, the communication between the fluid chambers B and E is blocked while, in place of this, the fluid chamber A which is disposed on the side of the pressure source comes to communicate with the fluid chamber B. The fluid chamber A is connected to a pressure accumulator 506.

When hydraulic pressure is introduced into the fluid chamber B by the communication between the fluid chambers A and B, a hydraulic force which counteracts the pedalling force on the brake pedal P comes to act on the fore end of the change-over piston 504. Therefore, this force acts as a reaction to the pedalling force. Accordingly, hydraulic pressure which is proportional to the pedalling force exerted on the brake pedal P is transmitted to the fluid chamber B from the fluid chamber A. Under this condition, the communication among the fluid chambers A, B and E is shut-off. When hydraulic pressure is introduced into the fluid chamber B, the control piston 503 is moved forward (to the left on FIG. 2) by the action of the introduced hydraulic pressure against the force of the return spring 505. Further, the change-over piston 504 is provided with a return spring 507.

The tandem master cylinder type control pressure generating device which is provided within the second cylinder II is arranged as described below:

The arrangement includes first and second pistons 510 and 511 and a pair of return springs 512 and 513 which are arranged to bias these pistons to their initial positions. These pistons 510 and 511 and the return springs 512 and 513 are disposed within the cylinder II. The rear end (the right end on FIG. 2) of the first piston 510 is connected to the control piston 503 and is arranged to receive the moving force of the control piston 503 as an external input. The piston 510 is thus arranged to cause control hydraulic pressure to be generated within a pair of control fluid chambers F and G. The hydraulic pressure of the pair of the control fluid chambers F and G is balanced by virtue of the balancing action of the second piston 511.

The first piston 510 is provided with a guide ring 514. One-way seal devices 515 and 516 are arranged to permit fluid supply from reservoirs 517 and 518 to the control fluid chambers F and G.

The master cylinder device 501 which is arranged as described above introduces a given value of hydraulic pressure into the introduced fluid chamber B according to a pedalling force exerted on the brake pedal P. Control hydraulic pressure is then generated in the control fluid chambers F and G according to the value of this introduced hydraulic pressure. A boosting ratio is then determined according to a pressure receiving area which determines the magnitude of a hydraulic reaction force which acts on the change-over piston 504.

Slave Cylinder Device 600: In the slave cylinder device of the embodiment, two concentrically opposed cylinders 601 and 602 are separated from each other in terms of hydraulic arrangement. A power piston 603 is disposed and extends inside of both these cylinders 601 and 602. The rear end (the right end on FIG. 2) of the power piston 603 faces a control fluid chamber H which communicates with the control fluid chamber F of the master cylinder device 501. The fore end (the left end on FIG. 2) of the power piston 603 engages a piston 604. The piston 604 has its fore end facing a brake fluid chamber I which communicates with the wheel cylinder W/C of a brake device. The piston 604 is arranged to discharge the pressure fluid of the brake fluid chamber I to a reservoir 606 under a normal condition (while in repose) with an incorporated opening and closing valve 605 thereof opened. When the piston 604 is moved by the power piston 603, the incorporated opening and closing valve 605 is closed to have thereby braking hydraulic pressure developed within the brake fluid chamber I. The opening and closing valve 605 is provided with a ball valve body which is disposed in the internal fluid passage of the piston 604 and is arranged to be separable from a valve seat by means of a lock rod 607. The power piston 603 and the piston 604 are respectively provided with return springs 608 and 609. The lock rod 607 is provided with a set spring 610. Within the cylinder 602 of the slave cylinder device 600 is arranged an antiskid fluid chamber C to push the power piston 603 back to the control fluid chamber H. This antiskid fluid chamber C communicates with the introduced fluid chamber B of the pedal responsive device via the antiskid control solenoid operated valve device 700.

With the slave cylinder device 600 arranged as described above, during normal brake application, the power piston 603 moves depending on the hydraulic pressure value transmitted to the control fluid chamber H. This causes the piston 604 to move. Accordingly, the opening and closing valve 605 closes and braking hydraulic pressure develops at the braking fluid chamber I. In this instance no hydraulic pressure is transmitted to the antiskid fluid chamber C.

During antiskid control, hydraulic pressure is transmitted to the antiskid fluid chamber C. The power piston 603 is then pushed back toward the control fluid chamber H. This causes the piston 604 to move backward. As a result, the braking hydraulic pressure decreases. Further, opening and closing valve 605 operates to open and close to again increase and hold the braking hydraulic pressure.

Antiskid Control Solenoid Operated Valve Device 700: The device 700 of this embodiment comprises in combination a power supply valve 704 (hereinafter referred to as PSV) which is a normally closed type solenoid valve inserted in a connecting passage 701 between the introduced fluid chamber B of the pedal responsive device and the antiskid fluid chamber C; a hold valve 705 which is a normally open type solenoid valve inserted in a passage 702 provided for introducing hydraulic pressure into the braking fluid chamber I during an antiskid control operation; and a decay valve 706 which is a normally open type solenoid valve inserted in a passage 703 for discharging the pressure fluid of the braking fluid chamber I into the reservoir 606 through the opening and closing valve of the slave cylinder device mentioned in the foregoing. A check valve 707 is inserted in the passage 701. The reservoir 606 is only symbolically shown but corresponds to a reservoir 519 which is arranged in one unified body with the master cylinder device. The control pressure of the hydraulic booster (the pressure of the control fluid chamber B) and the pressure of the braking fluid chamber I are preferably set at equal values.

Each of the solenoid valves of the solenoid operated valve device 700 is arranged to receive antiskid control signals for decreasing, increasing and retaining the braking hydraulic pressure and to be opened and closed under antiskid control. The operation of these valves is, for example, accomplished in a manner as shown in the following table:

|  | PSV | Hold valve | Decay valve |
| --- | --- | --- | --- |
| Under a normal condition: | closed | opened | opened |
| In decreasing the pressure: | opened | closed | opened |
| In increasing the pressure: | opened | opened | closed |
| In retaining the pressure: | opened | closed | closed |

The antiskid signals for operating these solenoid valves are obtained from a known antiskid control circuit (ECU) which is arranged to detect control data for decreasing, increasing or retaining the braking hydraulic pressure according to the velocity of the wheel and to produce the control signals as applicable. These solenoid valves may be operated by means of pulses.

The second embodiment further includes a pump 520 which is arranged to supply the fluid of the reservoir 606 to the pressure accumulator 6; and check valves 521 and 522.

In the hydraulic booster with the antiskid control device arranged as described in the foregoing, the fluid chambers A, B, and C of the antiskid control system are separately arranged from the fluid chambers F and H of the normal brake system in terms of hydraulic arrangement. The normal brake system is thus arranged to be not affected even in the event of a failure in the fluid pressure of the antiskid control system. This enhances the reliablility of the brake system. In addition to this advantage, it is another advantage of the embodiment that the antiskid control system which is rarely required to operate seldom has such a trouble as sticking due to rust as the antiskid control is arranged to be performed by applying hydraulic pressure to the power piston of the slave cylinder device.

The hydraulic booster combined with the antiskid control device according to this invention enhances the reliability of the antiskid control device and yet the normal brake system is never affected by the antiskid control operation. Further, according to the present invention, the mechanism which operates in the event of antiskid control is arranged to always operate during normal brake application. Therefore, compared with the conventional device arranged to have a piston, etc. become operative only during antiskid control, the possibility of such a trouble as sticking of seal part or the like decreases to a great degree, hence, the reliability of the invented device is greater than the conventional device.

The valve 204 or 704 opens at a time when an antiskid control is initiated and the power piston 103, 603 moves backward by the hydraulic pressure of the fluid introduced into the chamber C, thereby the piston 10, 510 also moves backward. Therefore, even if the fluid pressure source 6, 506 fails during an antiskid control, the power piston 103, 603 moves forward by the fluid pressure generated within the chamber F by the pedalling force given on the pedal P, generating a braking fluid pressure within the chamber I, thus a non-brake applying condition will not take place. Also, an amount of output of brake fluid from the chamber I to the wheel cylinder W/C is retained at a sufficient level, thus securing a sufficient braking force. By appropriately setting the clearance 1 in the Example shown in FIG. 1, an amount of rearward movement of the piston 10, 510 at a time when the antiskid control is initiated can be set at a proper level.

What is claimed is:

1. A hydraulic booster with an antiskid device, comprising:
   a hydraulic booster type pedal responsive device arranged to introduce from an accumulated pressure source, hydraulic pressure the level of which is determined depending on a pedalling force applied to a brake pedal;
   a master cylinder type control hydraulic pressure generating device which generates control hydraulic pressure according to the hydraulic action of said introduced hydraulic pressure;
   a slave cylinder comprising means forming opposed axially aligned cylinders (101, 102), a power piston (103, 603) located within one of said cylinders to receive at one end thereof said control hydraulic pressure and extending into the other said cylinder;
   a hydraulic piston (104, 604) located within said other cylinder and being in communication at one end thereof with a wheel cylinder (W/C) and engaging at the other end thereof with the other end of the power piston (103, 603);
   an antiskid fluid chamber (C) located within said one cylinder for having a hydraulic action force act via piston means (111) on the power piston (103) in counteraction against said control hydraulic pressure working on said power piston;
   a first valve device (204, 704) being provided in a passage connecting the antiskid fluid chamber (C) and the accumulated pressure source and being opened during antiskid control; a second valve device (205, 206; 705; 706) which is to be connected during antiskid control to the other end of said hydraulic piston (104, 604) and to one of the accumulated pressure source and a reservoir (106, 606) selectively; and a valve mechanism (105, 605) located within the hydraulic piston (104, 604), the valve mechanism being in a normally open position connecting the wheel cylinder (W/C) and the reservoir (106, 606) and the valve mechanism closing when the hydraulic piston (104, 604) is moved by the power piston (103, 603) by the action of the controlled hydraulic pressure.

2. A hydraulic booster with an antiskid device having a master cylinder device, comprising:
   a hydraulic booster type pedal responsive device arranged to introduce from an accumulated pressure source, hydraulic pressure the level of which is determined depending on a pedalling force applied to a brake pedal and
   a master cylinder type control hydraulic pressure generating device which generates control hydraulic pressure according to the hydraulic action of said introduced hydraulic pressure;
   a slave cylinder device including means forming opposed axially aligned cylinders, an axially elongated moving power piston located within one of said cylinders and extending into the other said cylinder and arranged to receive said control hydraulic pressure at one end thereof within the one of said cylinders and to move to generate braking hydraulic pressure within a brake fluid chamber confronting the other end thereof within the other said cylinder, and an antiskid fluid chamber which is disposed in the one of said cylinders to exert hydraulic pressure on said moving power piston in the direction of returning the piston;
   an antiskid control solenoid operated valve device which is arranged in a transmission line for transmitting the introduced hydraulic pressure of said pedal responsive device and which is arranged to supply and discharge a pressure fluid to and from said antiskid fluid chamber on the basis of an antiskid signal input;
   an annular return piston arranged in the one of said cylinders and encircling an axially extending part of said power piston, said return piston being operable to engage and accompany said power piston when the power piston moves from its initial position in excess of a given extent and then to allow a hydraulic acting force to be transmitted from said antiskid fluid chamber to said power piston via said return piston; and a hydraulic piston located within said other cylinder and having one end in communication with a wheel cylinder and another end in engagement with the other end of said power piston, a valve mechanism located within the hydraulic piston, the valve mechanism being in a normally open position connecting the wheel cylinder and the reservoir and the valve mechanism closing when the hydraulic piston is moved by the power piston by the action of the controlled hydraulic pressure.

3. A hydraulic booster according to claim 2, wherein said power piston (103) is elongated and is formed in the elongated direction into a stepped shape for receiving said control hydraulic pressure at a larger diameter part thereof, and said piston means comprises an annular piston (111), which faces said antiskid fluid chamber (C) and which slidably engages and encircles a smaller diameter part of said power piston, forming a prescribed clearance (l) between said annular piston (111) and the larger diameter part of the power piston.

* * * * *